UNITED STATES PATENT OFFICE.

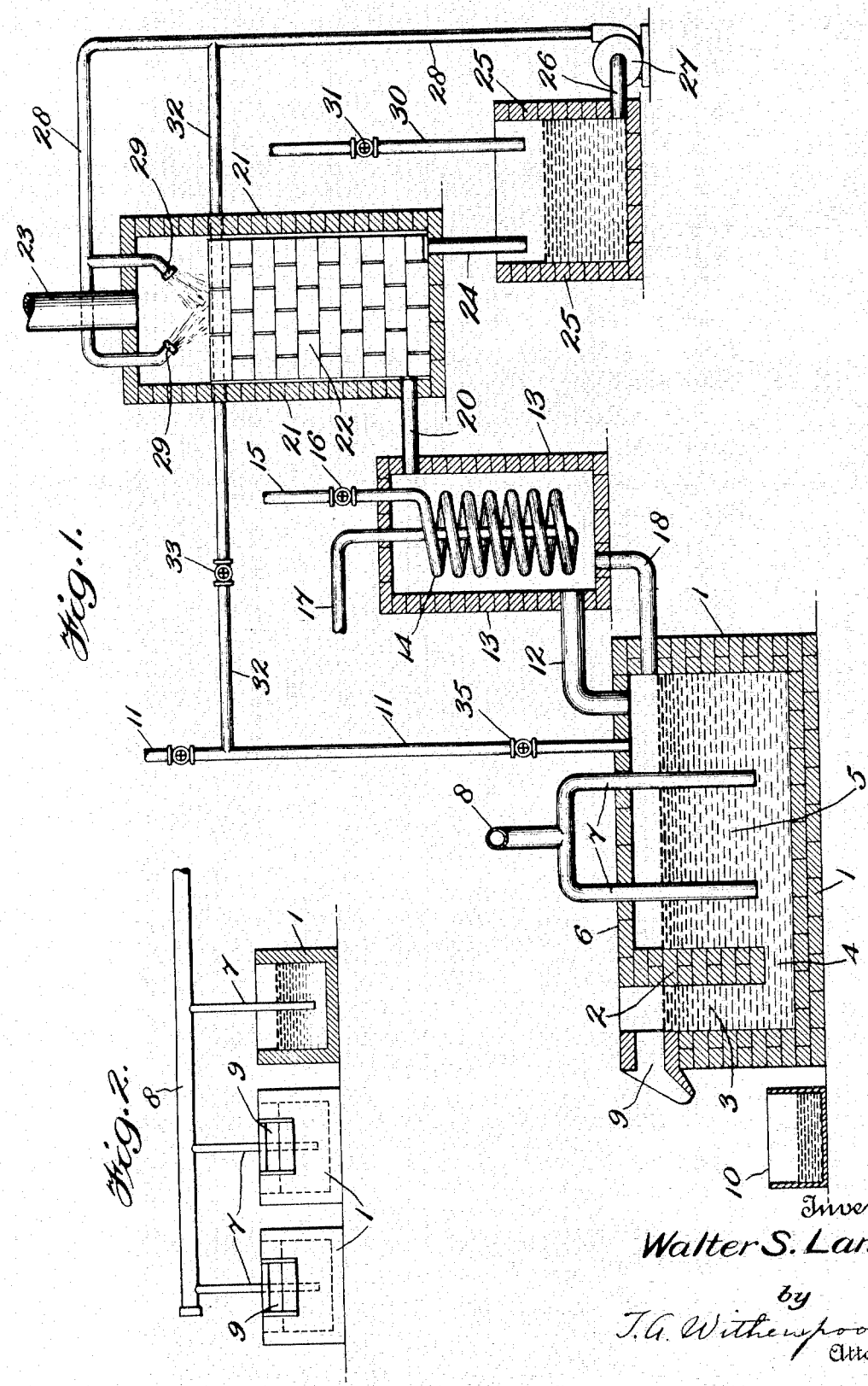

WALTER S. LANDIS, OF NEW YORK, N. Y., ASSIGNOR TO AMERICAN CYANAMID COMPANY, OF NEW YORK, N. Y., A CORPORATION OF MAINE.

PROCESS OF PRODUCING AMMONIUM NITRATE.

1,315,674.     Specification of Letters Patent.     Patented Sept. 9, 1919.

Application filed March 15, 1919. Serial No. 282,769.

*To all whom it may concern:*

Be it known that I, WALTER S. LANDIS, a citizen of the United States, residing at New York city, in the county of Queens and State of New York, have invented certain new and useful Improvements in Processes of Producing Ammonium Nitrate; and I do hereby declare the following to be a full, clear, and exact description of the invention, such as will enable others skilled in the art to which it appertains to make and use the same.

This invention relates to a process of producing ammonium nitrate and has for its object to provide a process and apparatus which will be less costly and more efficient in operation than those heretofore proposed.

With these and other objects in view the invention consists in the novel steps and combinations of steps constituting the process, and in the novel combinations of parts constituting the apparatus, all as will be more fully hereinafter described and particularly pointed out in the claims.

In the accompanying drawings forming a part of this specification,

Figure 1 is a diagrammatic sectional view of one form of apparatus made in accordance with this invention, and Fig. 2 is a diagrammatic sectional elevational view showing the use of a plurality of units adapted to be fed from a common ammonia main.

In order that the precise nature of the invention may be the more clearly understood it is said:—

In one of the well known prior processes of producing ammonium nitrate through the neutralization of nitric acid with ammonia, a small quantity of substantially neutral ammonium nitrate solution is first placed in a suitable tank or vessel, into which gaseous ammonia is led and distributed through suitable pipes and spiders near the bottom thereof. Nitric acid is then slowly introduced into the tank, the feed of ammonia gas being continued so as to keep the solution practically neutral. This double feeding of nitric acid and ammonia gas is continued until the tank is full of neutralized liquid, when the operation is transferred to another tank, and repeated as above, while the first tank is being emptied.

In such a neutralization process, considerable heat is developed and if the reaction is carried out at any appreciable rate, the solution is quickly brought to the boiling point. When a solution of ammonia in water is boiled, ammonia ($NH_3$) is lost, while if a solution of nitric acid in water is boiled, considerable quantities of nitric acid ($HNO_3$) are lost. Therefore, since it is practically impossible to maintain absolute neutrality during the addition of nitric acid and ammonia in the neutralizing tank, one or the other, or both, of these valuable constituents will be lost in greater or less quantities through evaporation, if the solution is boiled.

This said prior process, therefore, requires most careful attention and comparatively slow operation, if such losses are not to become excessive. But even with the closest attention and slowest operation the losses from the above source will average approximately ten per cent. of the materials charged into the tank, and since both of said materials are quite costly, these losses constitute a very considerable item in the cost of operation on a commercial scale.

A further disadvantage attending the above process resides in the fact that it has heretofore been impossible to operate satisfactorily more than one absorbing tank on a single ammonia line because of the varying hydrostatic heads or pressures which are bound to occur in the several tanks. The tank having the lowest depth of liquid will offer the least resistance to the flow of the ammonia gas, and therefore will take substantially all of the said gas from a common main. As a result, if it is desired to use a plurality of tanks, it has been necessary to operate either on such a scale that only one tank is in service at a time, or else each tank is provided with its own individual and distinct ammonia supply. Further, the capacity of these tanks not being very great (a standard size producing only say from 15 to 20 tons per tank per day) due to the fact that they must be constructed entirely of acid proof materials, a large installation becomes unduly complicated.

On the other hand, the process constituting the present invention seeks to eliminate the above disadvantages and complications, and to lend itself particularly to a duplication of units which may receive ammonia from a common supply main, up to any desired capacity of production.

Referring to the accompanying drawing 1 designates a tank constructed of brick, tile or other acid proof material, provided with the baffle wall 2 forming a "boot" or well 3, communicating as at 4 with the main portion 5 of the said tank. The said main portion 5 is preferably closed as by the cover portion 6 through which pass a plurality of pipes 7 connected as shown to a common ammonia main 8. The "boot" or well 3 is provided with an outlet 9, adapted to discharge the ammonium nitrate liquor into a suitable receptacle 10, as will presently appear, while 11 indicates a pipe for supplying nitric acid to the tank 1.

12 designates a pipe for conveying unabsorbed gases, steam, etc., from the neutralizing tank 1 to a condensing chamber 13 of acid proof construction, which chamber is provided with a suitable condenser coil 14, through which cold water is adapted to pass from the inlet 15 under control of the valve 16, to the discharge pipe 17. 18 represents a drain or return pipe through which the condensed vapors are returned to the neutralizing tank 1.

20 indicates a pipe or connection for carrying any gases and vapors which may not be condensed in the chamber 13 to an absorption tower 21, likewise of acid-proof construction, and provided with suitable packing 22, as will be clear from the drawing. The said tower 21 is also provided at or near its top with a vent 23, open to the atmosphere, and near its bottom with a drain 24, adapted to discharge liquid into a tank 25. The said tank 25 is provided with an outlet 26, connected to the suction side of a suitable pump 27, adapted to force liquid from said tank 25 through the pipe 28 to the top of the tower 21, where it is distributed by means of the sprays 29 over the tower packing 22 as shown. Nitric acid from a storage reservoir may be supplied to the tank 25 as needed by means of the pipe 30 controlled by the valve 31, while 32 indicates a connection between the pipes 28 and 11, controlled by a valve 33, whereby liquid may be transferred to the neutralizing tank 1 from the tank 25 through the pump 27, as will be readily apparent.

In carrying out the present process nitric acid of any desired strength, but preferably of a 50 per cent. to 60 per cent. solution, is introduced into the neutralizing tank 1 through the pipe 11, up to the level of the outlet 9, as indicated, after which the supply is stopped at the valve 35. Acid is also fed into the tank or receptacle 25 by means of the pipe 30, and is circulated by the pump 27 from the said tank 25 through the pipe 28, sprays 29, absorption tower 21, and pipe 24, as will be readily apparent, while at the same time cooling water is turned on in the coil 14 of the condenser 13.

Ammonia, preferably in the gaseous form, is fed into the neutralizing tank 1 from the ammonia main 8 through the distributing pipes 7, bubbling up through the acid in said tank and being for the greater part absorbed thereby. The reaction generates a considerable amount of heat which soon causes the liquid to boil, giving off nitric acid vapors which pass through the connection 12, to the condenser 13, where they are again liquefied and returned to the tank 1 through the pipe 18.

After the operation as above described has continued for a period of time dependent mainly upon the quantity and strength of the nitric acid in the tank 1, and upon the rate at which the ammonia is fed thereto, the liquid in the said tank becomes completely neutralized, as may be determined by any of the well known methods. When this point is reached the valve 35 is opened and fresh nitric acid is fed into the tank 1 from the supply pipe 11, causing the neutralized liquid therein to overflow through the outlet 9 into the receptacle 10 from which it may be removed as desired for storage or shipment.

In practice the feed of nitric acid to the tank 1 is usually so regulated that there is a constant excess of ammonia gas discharged from the distributing pipes 7, and inasmuch as the boiling hot ammonium nitrate solution in the said tank cannot retain this said gas, the excess ammonia passes along with steam, and at times, also with some nitric acid vapors to the condenser 13, where the steam and acid are condensed, after absorbing some of the ammonia gas, and are returned to the tank 1. Any further excess of ammonia will pass through the condenser into the absorption tower 21, where it will be caught and neutralized by the acid circulating therethrough. This tends to neutralize the acid in the tank 25, and as this said acid becomes nearly neutral, it is transferred to the neutralizing tank 1 by means of the pipes 28, 32 and 11, while fresh acid is added to the tank 25.

The tank 1 is a comparatively large vessel and with its great quantity of material under treatment, it does not require any extremely close regulation of either the ammonia gas or the flow of acid through pipe 11 to produce ammonium nitrate which contains only an extremely small fraction of one per cent. of ammonia or of excess nitric acid in the over-flow to the storage tank. Any slight deficiency of balance of ammonia to acid, is taken care of by the condenser 13 and the final absorption tower 21, and the whole apparatus works with less actual attention than would be necessary to be given to a single absorption tank of the old style, although this present apparatus has been built and is in operation with a capacity of about 150 tons of ammonium nitrate per unit per day.

By building additional units and setting the outlet 9 so that the hydrostatic heads in the neutralizing tanks are all the same, as shown in Fig. 2, any number of them can be operated from the common ammonia main 8 without any difficulty whatever.

In actual commercial operation this absorption system has shown recoveries of both ammonia and nitric acid of from 97 to 99 per cent. of the materials fed to it, even in the hands of untrained and unskilled operators, while, by the use of acid proof masonry and high silicon alloys, no construction difficulties are met with.

It is obvious that those skilled in the art may vary the steps constituting the process, as well as the arrangement of parts constituting the apparatus, without departing from the spirit of the invention, and therefore I do not wish to be limited to the above disclosure except as may be required by the claims.

What I claim is:—

1. The process of producing ammonium nitrate which consists in providing a solution of nitric acid; treating said solution with ammonia to neutralize the same; suitably recovering the vapors given off by the reaction; and automatically returning the said recovered vapors to the solution, substantially as described.

2. The process of producing ammonium nitrate which consists in providing a solution of nitric acid; passing gaseous ammonia through said solution to neutralize the same; condensing the acid vapors given off by the reaction; and automatically returning the condensate to the solution, substantially as described.

3. The process of producing ammonium nitrate which consists in providing a solution of nitric acid; treating said solution with an excess of ammonia, collecting the excess ammonia and the acid vapors given off by the reaction; condensing the said vapors in the presence of said excess ammonia, whereby said excess is absorbed by the condensate; and automatically returning said condensate to said solution, substantially as described.

4. The process of producing ammonium nitrate which consists in providing a solution of nitric acid; treating said solution with an excess of gaseous ammonia; collecting the unabsorbed ammonia and the acid vapors given off by the reaction; condensing the said vapors in the presence of said unabsorbed ammonia, whereby a portion of said unabsorbed ammonia is absorbed by the condensate; returning said condensate to said solution; and suitably recovering the remainder of said unabsorbed ammonia, substantially as described.

5. The process of producing ammonium nitrate which consists in providing a solution of nitric acid; treating said solution with an excess of gaseous ammonia to neutralize the same; collecting the unabsorbed ammonia and the acid vapors given off by the reaction; condensing said vapors in the presence of said unabsorbed ammonia, whereby a portion thereof is absorbed by the condensate; treating the remainder of said unabsorbed ammonia with nitric acid to form ammonium nitrate; and returning said condensate and said nitrate to said solution, substantially as described.

6. The process for the continuous production of ammonium nitrate which consists in providing a solution of nitric acid; passing an excess of gaseous ammonia through said solution to neutralize the same; adding nitric acid to said solution as it becomes neutral; collecting the unabsorbed ammonia and the acid vapors given off by the reaction; condensing said vapors in the presence of said unabsorbed ammonia, whereby a portion thereof is absorbed by the condensate; returning said condensate to said solution; treating the remainder of said unabsorbed ammonia with nitric acid; and supplying fresh nitric acid to said unabsorbed ammonia, substantially as described.

7. The process for the continuous neutralization of volatile acids by gases, which consists in passing said gases through said acids at a predetermined rate; collecting the vapors from the reaction; cooling and condensing said vapors; and passing the residual gases from said condensation through an absorption tower for recovering the valuable constituents, substantially as described.

In testimony whereof I affix my signature in presence of two witnesses.

WALTER S. LANDIS.

Witnesses:
 HAZEL JAMES,
 JOHN J. ELLEN.